(12) United States Patent
Moyal et al.

(10) Patent No.: US 12,406,085 B2
(45) Date of Patent: Sep. 2, 2025

(54) SEGMENTATION OF DATA IN HYBRID CLOUD

(71) Applicant: INTERNATIONAL BUSINESS MACHINES CORPORATION, Armonk, NY (US)

(72) Inventors: Shailendra Moyal, Pune (IN); Sarbajit K. Rakshit, Kolkata (IN); Venkata Vara Prasad Karri, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 17/588,772

(22) Filed: Jan. 31, 2022

(65) Prior Publication Data
US 2023/0244810 A1    Aug. 3, 2023

(51) Int. Cl.
| | |
|---|---|
| G06F 21/62 | (2013.01) |
| G06F 18/24 | (2023.01) |
| G06N 20/00 | (2019.01) |

(52) U.S. Cl.
CPC .... G06F 21/6245 (2013.01); G06F 18/24765 (2023.01); G06N 20/00 (2019.01)

(58) Field of Classification Search
CPC .......... G06F 21/6245; G06F 18/24765; G06N 20/00
USPC .......................................... 726/26
See application file for complete search history.

(56) References Cited

U.S. PATENT DOCUMENTS

| | | | |
|---|---|---|---|
| 11,070,617 B2 | 7/2021 | Lee et al. | |
| 2017/0061143 A1* | 3/2017 | Rooney | G06F 21/6263 |
| 2018/0191678 A1* | 7/2018 | Polcha, Sr. | H04L 63/0272 |
| 2021/0103477 A1 | 4/2021 | Dey et al. | |
| 2021/0103479 A1 | 4/2021 | Dey et al. | |
| 2023/0195515 A1* | 6/2023 | Zhang | G06F 9/5027 |
| | | | 718/102 |

FOREIGN PATENT DOCUMENTS

CN    110866276 A    3/2020

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.

(Continued)

*Primary Examiner* — Michael S McNally
(74) *Attorney, Agent, or Firm* — CHIP LAW GROUP (57) ABSTRACT

A computer hardware system associated with a hybrid cloud including a private cloud and a public cloud has a hardware processor configured to perform the following executable operations. A plurality of data sets of unprocessed data is randomly sampled to generate a plurality of random samples respectively associated with each of the plurality of data sets. The plurality of random samples is pre-processed, using a machine learning engine, to identify hidden correlations contained therein. The hidden correlations are evaluated against a confidentiality model to characterize each of the plurality of segments as to confidentiality. The data sets are segmented by assigning the data sets to one of the private cloud or the public cloud based upon the evaluating. Data sets assigned to the private cloud based upon the segmenting are processed using the private cloud.

20 Claims, 5 Drawing Sheets

(56) References Cited

OTHER PUBLICATIONS

Rajkamal, M. et al., "Sensitive Data Identification and Protection in a Structured and Unstructured Data in Cloud Based Storage," Annals of the Romanian Society for Cell Biology, Mar. 2021, vol. 25, No. 2, pp. 1157-1166.

* cited by examiner

SEGMENTATION OF DATA IN HYBRID CLOUD

BACKGROUND

The present invention relates to cloud computing, and more specifically, to segmenting data to be processed in a hybrid cloud based upon confidentiality.

Figure 3:
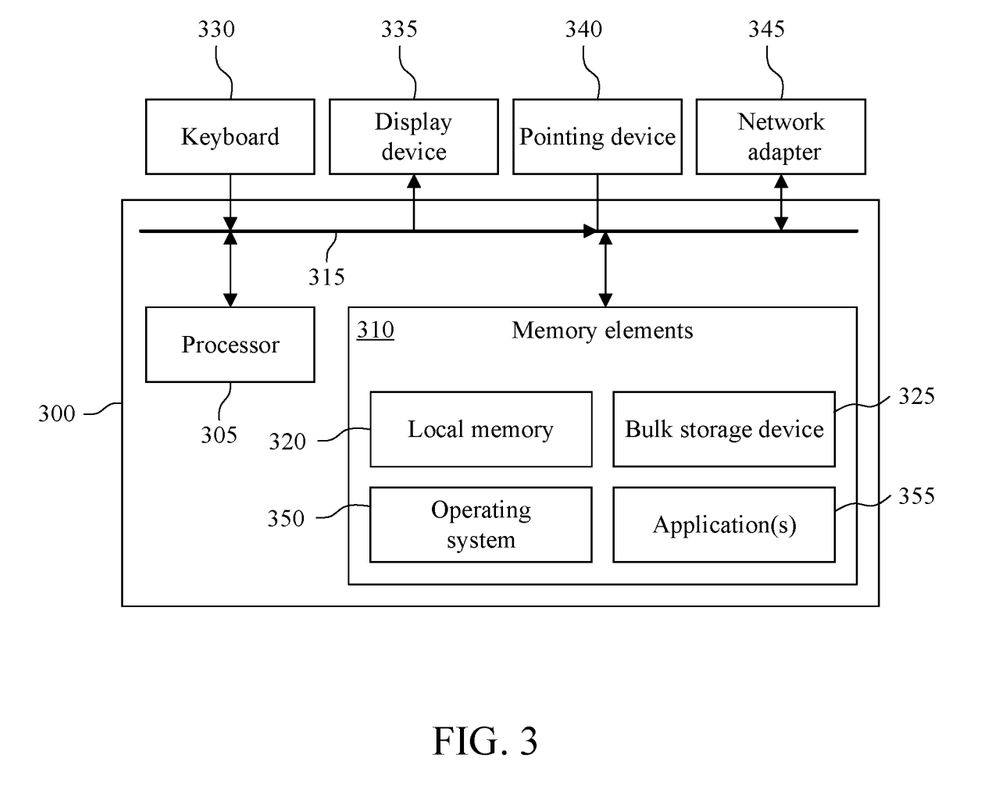
FIG. 3 is a block diagram illustrating an example of computer hardware system for implementing the processing system of FIG. 1.
Figure 4:
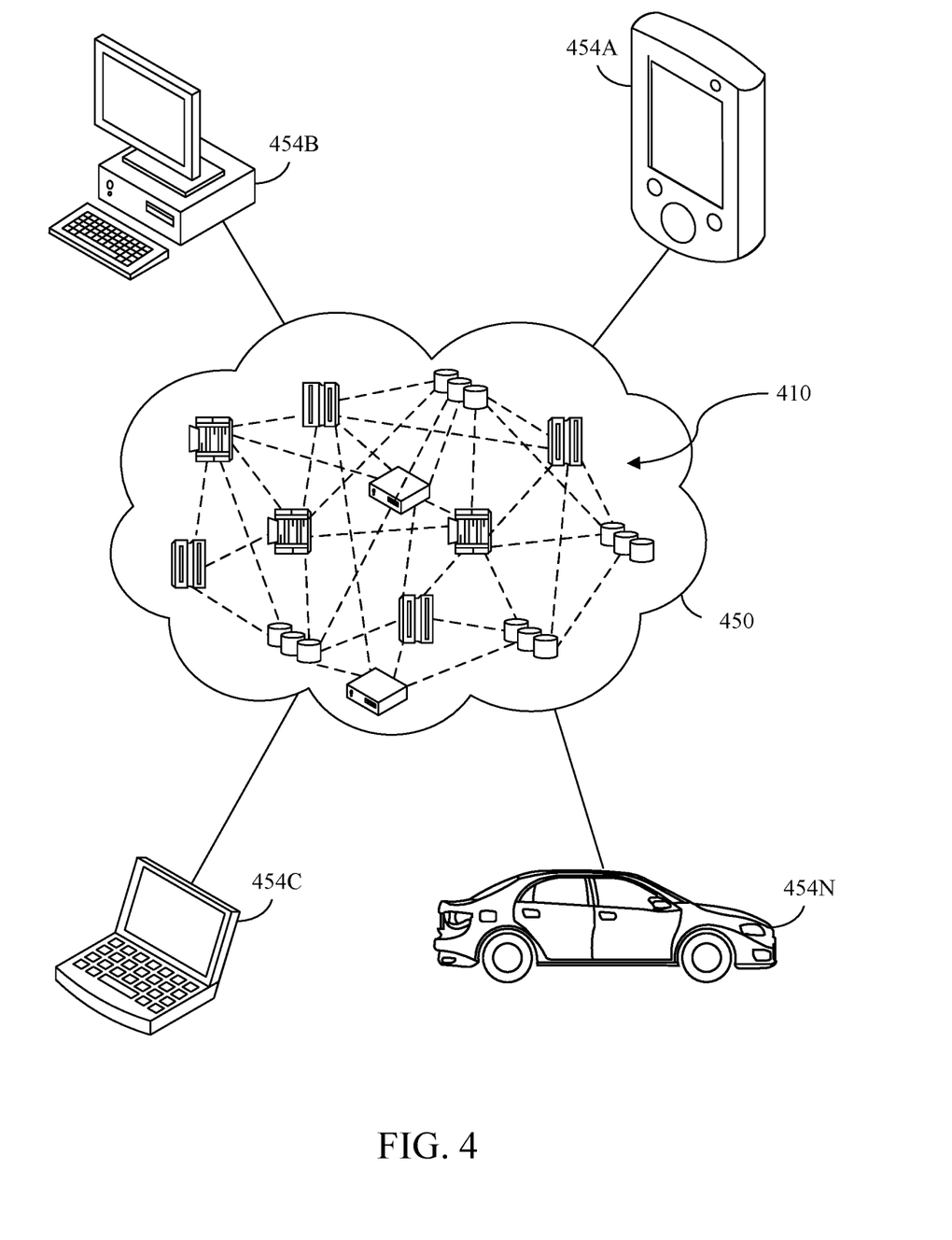
FIG. 4 depicts a cloud computing environment according to an embodiment of the present invention.

Although discussed in greater detail with regard to FIGS. 3 and 4, a hybrid cloud is a known computing solution that combines a private cloud services with one or more public cloud services. The private and public cloud services are oftentimes combined with proprietary software that enable communications between the different cloud services. A private cloud typically includes a firewall to prevent unauthorized entities from accessing data stored within the private cloud.

One benefit of a hybrid cloud is that it provides end users (e.g., an enterprise that operates the private cloud) greater flexibility in moving workloads between the different cloud services based upon factors such as cost and capacity. Another benefit of a hybrid cloud service is the ability to provide an end user with greater control over the private data of the end user. Specifically, an end user can store sensitive/private data in the private cloud and/or local data center—as opposed to having this sensitive data being stored in a public cloud. In a hybrid cloud service, the end user can rely upon the private cloud to protect the sensitive data but also leverage the robust computation resources that are available in a managed public cloud.

Leveraging the different benefits of the two different types of clouds (i.e., private versus public) requires an end user to identify the best cloud for storing particular data and the best cloud for performing analysis of the particular data. Current solutions exist to characterize the existing data, which helps to determine where particular data can be stored and/or analyzed. However, there is a need to both: (i) characterize unknown data, such as data that is generated using the existing data as well as (ii) identify the particular type of cloud best suited for storing/analyzing that unknown data.

SUMMARY

A method within a computer hardware system associated with a hybrid cloud including a private cloud and a public cloud has a hardware processor configured to perform the following executable operations include the following operations. A plurality of data sets of unprocessed data is randomly sampled to generate a plurality of random samples respectively associated with each of the plurality of data sets. The plurality of random samples is pre-processed, using a machine learning engine, to identify hidden correlations contained therein. The hidden correlations are evaluated against a confidentiality model to characterize each of the plurality of segments as to confidentiality. The data sets are segmented by assigning the data sets to one of the private cloud or the public cloud based upon the evaluating. Data sets assigned to the private cloud based upon the segmenting are processed using the private cloud.

The method can also include processing data sets assigned to the public cloud based upon the segmenting using the public cloud. The segmenting can include identifying a sequence for the processing the data sets assigned to the private cloud and the processing the data sets assigned to the public cloud. The plurality of data sets of the unprocessed data can be stored in the private cloud and the public cloud, and the segmenting can include transferring data sets stored in the private cloud to the public cloud. The segmenting can further include determining a format of the unprocessed data to be processed based upon confidentiality requirements. Also, the unprocessed data can be dynamically re-segmented based upon changes to the unprocessed data.

A computer hardware system associated with a hybrid cloud including a private cloud and a public cloud has a hardware processor configured to perform the following executable operations. A plurality of data sets of unprocessed data is randomly sampled to generate a plurality of random samples respectively associated with each of the plurality of data sets. The plurality of random samples is pre-processed, using a machine learning engine, to identify hidden correlations contained therein. The hidden correlations are evaluated against a confidentiality model to characterize each of the plurality of segments as to confidentiality. The data sets are segmented by assigning the data sets to one of the private cloud or the public cloud based upon the evaluating. Data sets assigned to the private cloud based upon the segmenting are processed using the private cloud.

The computer hardware system can also be configured to process data sets assigned to the public cloud based upon the segmenting using the public cloud. The segmenting can include identifying a sequence for the processing the data sets assigned to the private cloud and the processing the data sets assigned to the public cloud. The plurality of data sets of the unprocessed data can be stored in the private cloud and the public cloud, and the segmenting can include transferring data sets stored in the private cloud to the public cloud. The segmenting can further include determining a format of the unprocessed data to be processed based upon confidentiality requirements. Also, the unprocessed data can be dynamically re-segmented based upon changes to the unprocessed data.

A computer program product includes a computer readable storage medium having program code stored thereon. The program code causes a computer hardware system associated with a hybrid cloud including a private cloud and a public cloud to perform the following operations. A plurality of data sets of unprocessed data is randomly sampled to generate a plurality of random samples respectively associated with each of the plurality of data sets. The plurality of random samples is pre-processed, using a machine learning engine, to identify hidden correlations contained therein. The hidden correlations are evaluated against a confidentiality model to characterize each of the plurality of segments as to confidentiality. The data sets are segmented by assigning the data sets to one of the private cloud or the public cloud based upon the evaluating. Data sets assigned to the private cloud based upon the segmenting are processed using the private cloud.

The program code can also cause the computer hardware system to perform processing data sets assigned to the public cloud based upon the segmenting using the public cloud. The segmenting can include identifying a sequence for the processing the data sets assigned to the private cloud and the processing the data sets assigned to the public cloud. The plurality of data sets of the unprocessed data can be stored in the private cloud and the public cloud, and the segmenting can include transferring data sets stored in the private cloud to the public cloud. The segmenting can further include determining a format of the unprocessed data to be processed based upon confidentiality requirements. Also, the unprocessed data can be dynamically re-segmented based upon changes to the unprocessed data.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
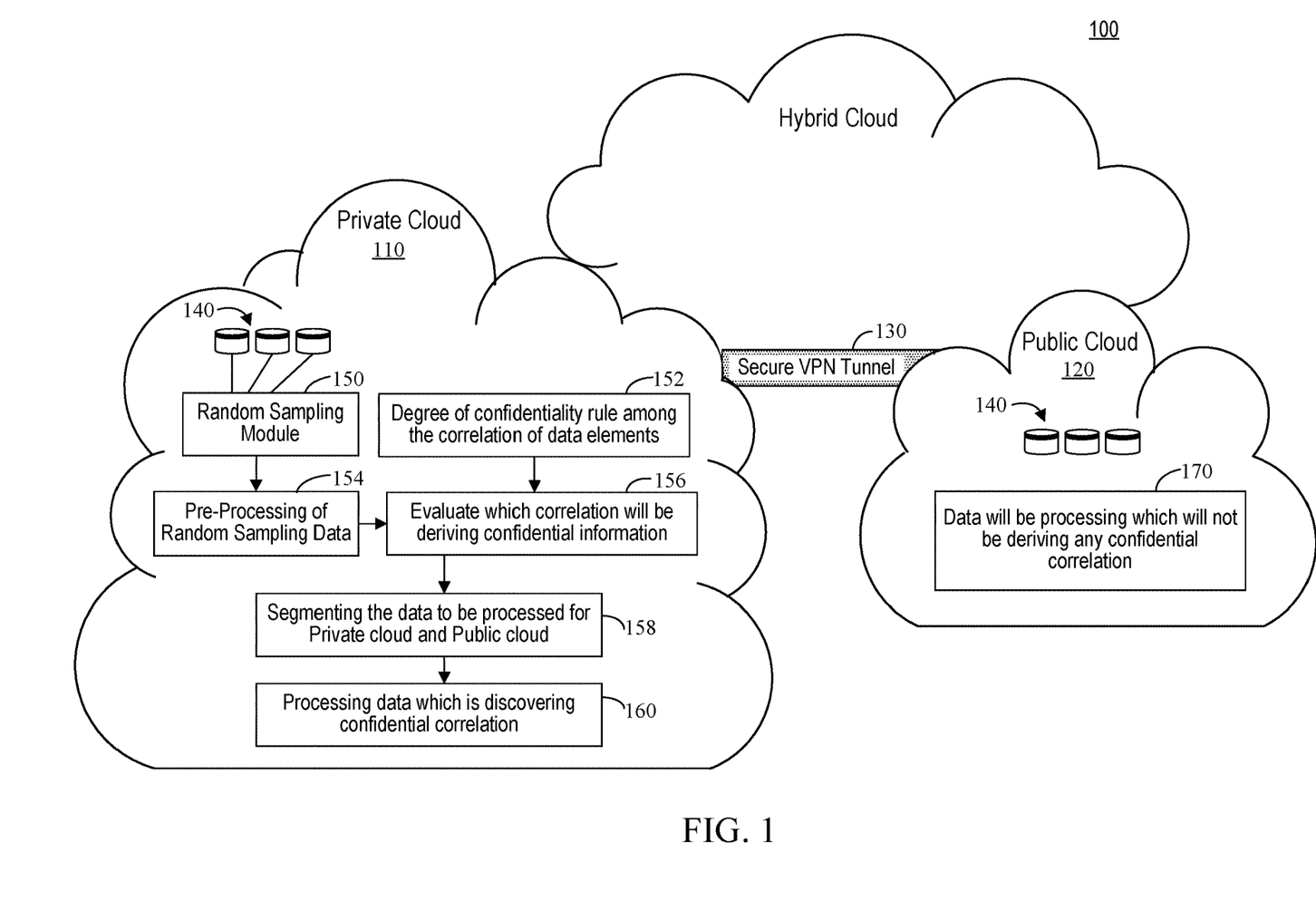
FIG. 1 is a block diagram illustrating an example of architecture for a hybrid cloud computing environment according to an embodiment of the present invention.
Figure 2:
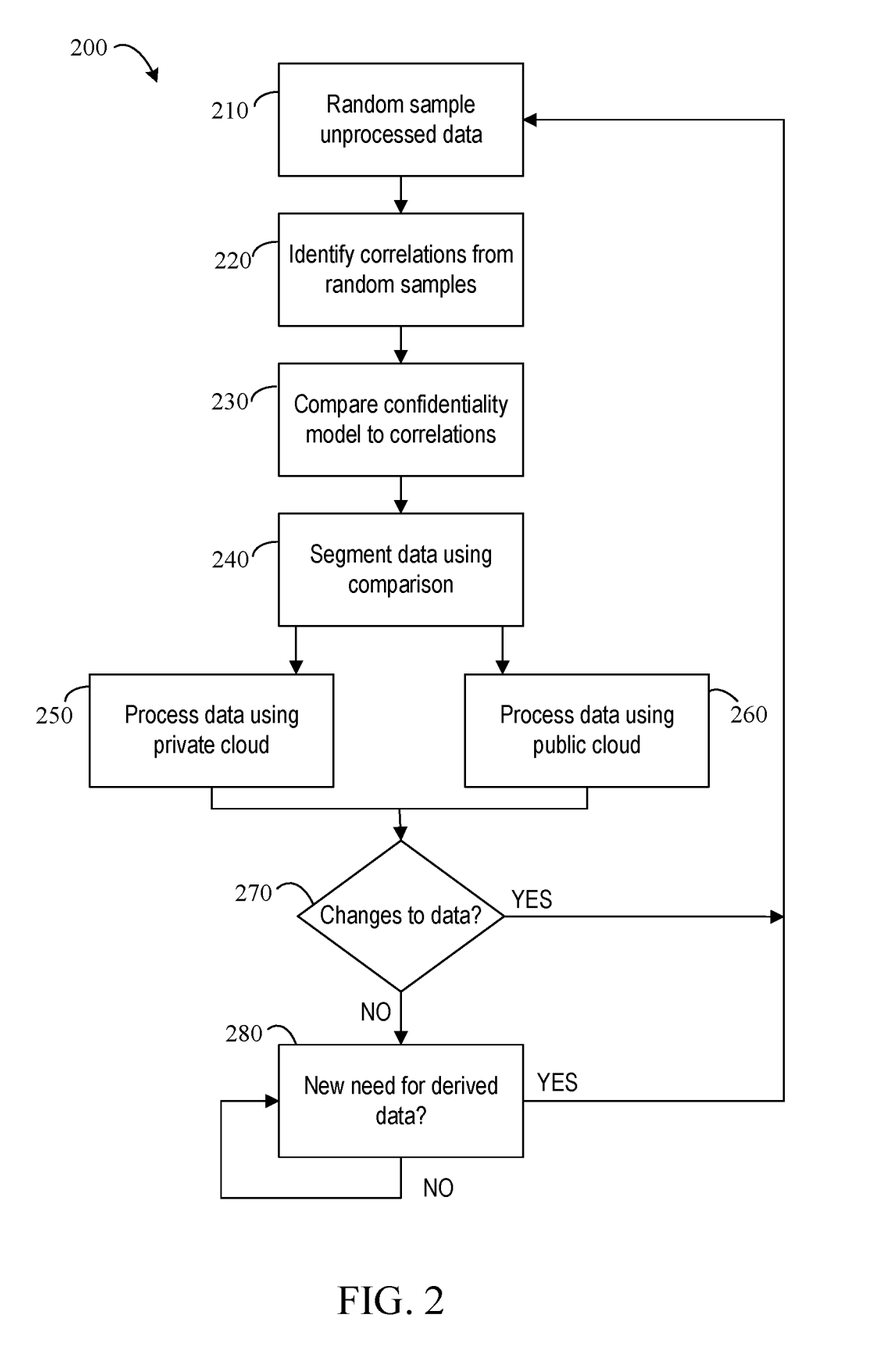
FIG. 2 is a block diagram illustrating an example method using the architecture of FIG. 1.

Reference is made to FIG. 1 and FIG. 2, which respectively illustrate an example hybrid cloud 100 and methodology 200 of implementing certain aspects of the present disclosure. More generic aspects of the hybrid cloud 100 are discussed with reference to FIGS. 3 and 4. As illustrated in FIG. 1, the hybrid cloud 100 includes a private cloud 110 protected by a firewall (not illustrated) that is communicatively connected, e.g., using a virtual private network (VPN) tunnel 130, to the public cloud 120. Both the private cloud 110 and the public cloud 120 respectively include dedicated processing resources 160, 170, such as servers, memory, and the like.

In 210, a random sampling module 150 within the private cloud 150 takes a random sample (i.e., a subset) of raw data sets 140 stored within the private cloud 110. The random sampling module 150 can also take random sample of raw data sets associated with the end user and stored within the public cloud 120. The raw data 140 can also be referred to as enterprise data. Although not limited in this manner, the random sampling module 150 can use a random sampling algorithm. Examples of sampling algorithms include simple random sampling, stratified sampling, reservoir sampling, undersampling, and oversampling. Each of the raw data sets 140, whether from the private cloud 110 or the public cloud 120, can previously be identified as confidential data or non-confidential data.

In 220, once the individual random samples have been identified, a pre-processing module 150 within the private cloud 150 performs a pre-processing on these random samples to identify hidden correlations. Although not limited in this manner, the pre-processing module 150 can perform one or more different types of pre-processing on the random samples to identify hidden correlations. For example, the pre-processing module 150 can include a machine learning engine that identifies the hidden correlations within the random samples. Types of machine learning paradigms capable of being used with the machine learning engine include supervised learning (SL), unsupervised learning (UL), and reinforced learning (RL). Examples of RL algorithms that may be used include Markov decision process (MDP), Monte Carlo methods, temporal difference learning, Q-learning, Deep Q Networks (DQN), State-Action-Reward-State-Action (SARSA), a distributed cluster-based multi-agent bidding solution (DCMAB), and the like.

In 230, an evaluation engine 156 compares the results of the pre-processing in 220 (e.g., the identified hidden correlations) with a confidentiality model. Although not limited in this manner, a dynamic change accommodation engine 152 can manage the confidentiality model. The confidentiality model is not limited as to a particular form and one or more confidentiality models, each having a different form, can also be used. For example, the confidentiality model can optionally take the form of a smart contract that also reflects the priorities of the end user (i.e., the enterprise). As another example, the confidentiality model can be a model/defined rule set. Regardless of the particular form, the confidentiality model incorporates enterprise policy with regard to data confidentiality, security, and privacy. For example, the data sets can also be classified by the evaluation engine 156, using the hidden correlations generated using each data set, based upon confidentiality. In certain instances, the data sets can be classified as either confidential or not confidential. However, in other instances, the data sets can be classified into varying degrees of confidentiality, such as high, medium, or none. The results of the evaluation engine 156 are then forwarded to the segmenting and sequencing engine 158.

In 240, a segmenting and sequencing engine 158 segments the raw data 140 based upon the comparison performed in 230 and assigns each data set of the raw data 140 to one of the private cloud 110 or public cloud 120. For example, portions of the raw data 140 that yield hidden correlations deemed to be confidential can be processed within the private cloud 110. Conversely, portions of the raw data 140 that do not yield hidden correlations deemed to be confidential can be processed within the public cloud 120. For example, a data set classified as being "medium" confidentiality is ideally processed in the private cloud 110 but is also capable of being processed in the public cloud 120. Additionally, a data set classified as being "high" confidentiality may be determined as necessarily being processed in the private cloud 110, and a data set classified as having "none" confidentiality could be processed in either the private cloud 110 or the public cloud 120.

An example of segmenting is as follows. If an analysis outcome of data element 1, 2, 3, 4 does not create confidential analyzed outcome, then this data can be transferred to and processed by the public cloud 120. However, if data elements 5 and 6 are added to data elements 1, 2, 3, 4 and an analysis outcome of 1, 2, 3, 4, 5, 6 becomes confidential, then data element 1, 2, 3, 4, can still be moved to the public cloud 120 but analysis of all the elements can be performed in private cloud 110.

In addition to confidentiality, another factor that may determine what data sets of the raw data 140 are processed where in the hybrid cloud is the processing resources and availability of both the private cloud 110 and the public cloud 120. For example, a data set classified as being "medium" confidentiality could be processed in the private cloud 110 during times of high availability of resources in the private cloud 110 but will be processed in the public cloud 120 during times of low availability of resources in the public cloud 120. Consequently, the segmenting and sequencing engine 158 is capable of both identifying available resources 160 in the private cloud 110 as well as scheduling those resources 160 for use in processing the data sets of the raw data 140 that are assigned to the private cloud 110.

Another factor that will determine how the raw data 140 is split into data sets is the type of analysis respectively available in the private cloud 110 and the public cloud 120. In particular, a particular data set cannot be assigned to a particular cloud 110, 120 if that particular cloud 110, 120 is incapable of performing the type of analysis needed to be perform on the particular data set. Once the different data sets of the raw data 140 are segmented, these data sets can then be transferred and/or made available to the respective private/public cloud 110, 120 to which the data set is assigned for subsequent processing, as described in 250, 260.

Additionally, the segmenting and sequencing engine 158 can determine the sequence by which the raw data 140 is processed. For example, the segmenting and sequencing engine 158 may determine that certain data sets of the raw data 140 should be processed prior to other data sets. Alternatively, the segmenting and sequencing engine 158 may determine that certain data sets of the raw data 140 can be processed in parallel.

Although not limited in this manner, the segmenting and sequencing engine 158 can also determine how results of the processing in 250, 260, is to be presented. For example, the segmenting and sequencing engine 158 may make use of co-relations identified from the random sampling to determine what results/raw data can be shared with a consumer and the form of the data sets of raw data being processed. The form of the raw data be processed could be, for example, a masked form, encrypted, anonymized with interrelated calculation, individually or clubbed together with other data, and the like.

In 250 and 260, processing resources 160, 170 respectively located in the private cloud 110 and the public cloud 120 performs processing on the segmented data sets. As discussed above, based upon the analysis in 240, the sequence by which the various segmented data sets are analyzed can cause portions of the segmented data sets to be processed in parallel and/or serially.

In 270, a dynamic change accommodation engine 152 can identify changes to one or more of the raw data 140 or the enterprise associated with the end user. When these changes are identified, the dynamic change accommodation engine 152 dynamically changes/updates the confidentiality model against which the correlations are evaluated in 230. The raw data 140 can be reevaluated and reprioritized using the aforementioned operations 210-260. The dynamic change accommodation engine 152 can also analyze degree of updates derived from new correlation found in data with random sampling and utilizing already received insights that requests data from private cloud and public cloud data processing results and future data processing jobs.

In 280, the system waits for requests for new/additional derived data. These requests can be event driven or based upon direct requests (i.e., on demand) from an end user. As a need for new derived data is identified, the system can repeat the operations of 210-260 to provide newly-derived data.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

The communication network 150 is the medium used to provide communications links between various devices and data processing systems connected together within the API system 100/computing environment (or network data processing system, etc.) 100. The communication network 150 may include connections, such as wire, wireless communication links, or fiber optic cables. The communication network 150 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies.

FIG. 3 is a block diagram illustrating example architecture for a data processing system 300. The data processing system 300 can include at least one processor 305 (e.g., a central processing unit) coupled to memory elements 310 through a system bus 315 or other suitable circuitry. As such, the data processing system 300 can store program code within the memory elements 310. The processor 305 can execute the program code accessed from the memory elements 310 via the system bus 315. It should be appreciated that the data processing system 300 can be implemented in the form of any system including a processor and memory that is capable of performing the functions and/or operations described within this specification. For example, the data processing system 300 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The data processing system 300 also can include one or more cache memories (not shown) that provide temporary storage of at least some program code in order to reduce the number of times program code must be retrieved from the local memory 320 and/or bulk storage device 325 during execution.

Input/output (I/O) devices such as a display 330, a pointing device 335 and, optionally, a keyboard 340 can be coupled to the data processing system 300. The I/O devices can be coupled to the data processing system 300 either directly or through intervening I/O controllers. For example, the display 330 can be coupled to the data processing system 300 via a graphics processing unit (GPU), which may be a component of the processor 305 or a discrete device. One or more network adapters 345 also can be coupled to data processing system 300 to enable the data processing system 300 to become coupled to other systems, computer systems, remote printers, and/or remote storage devices through intervening private or public networks. Modems, cable modems, transceivers, and Ethernet cards are examples of different types of network adapters 345 that can be used with the data processing system 300.

As pictured in FIG. 3, the memory elements 310 can store the components of the API system 100 of FIG. 1. Being implemented in the form of executable program code, these components of the data processing system 300 can be executed by the data processing system 500 and, as such, can be considered part of the data processing system 300.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 450 to be used with the API system 100 is depicted. As shown, cloud computing environment 450 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 410 and cloud computing environment 450 can communicate with any type of computerized device over any type of network and/or network addressable connection (e.g., using a web browser).

Figure 5:
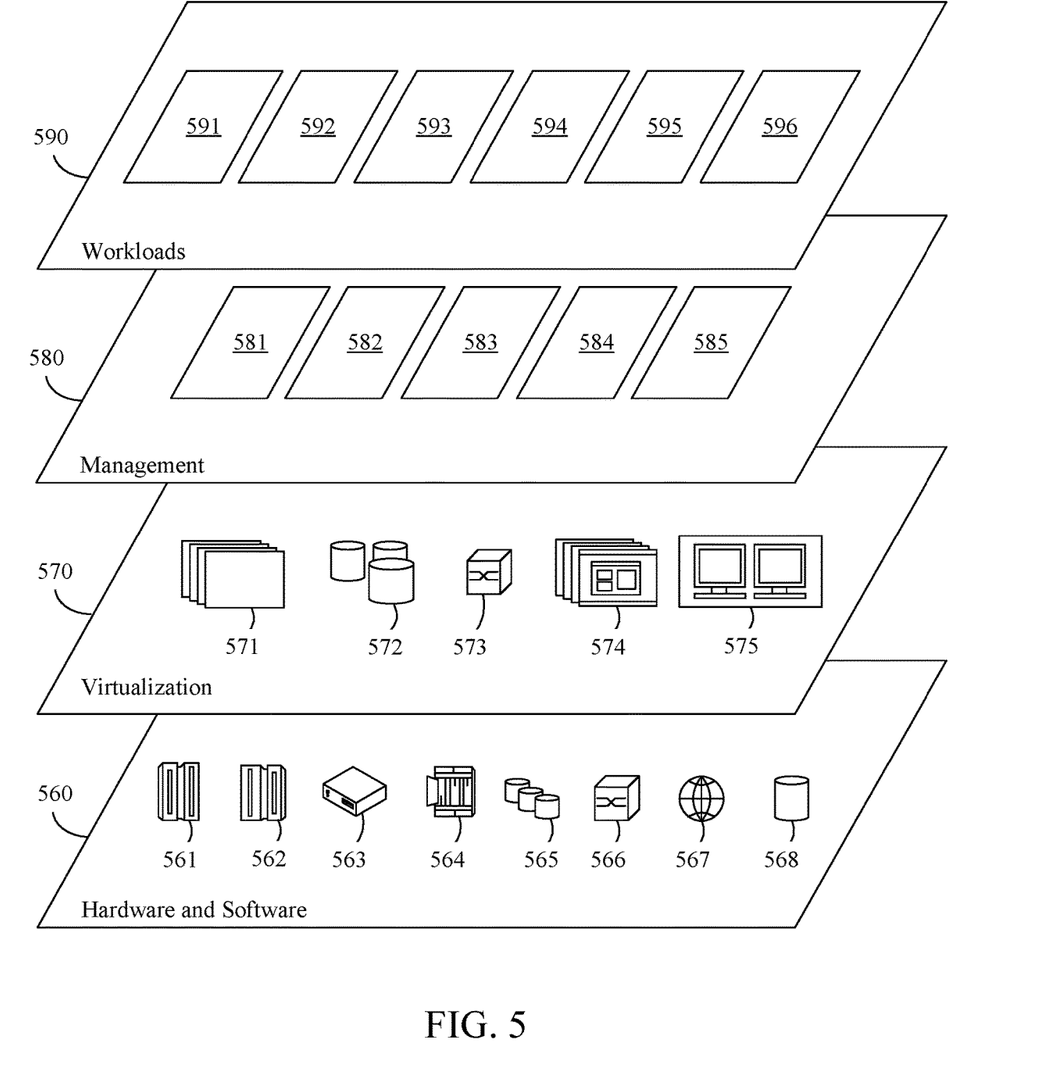
FIG. 5 depicts abstraction model layers according to an embodiment of the present invention.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and operations of the various modules/engines 596 illustrated in FIG. 1.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented process within a computer hardware system associated with a hybrid cloud including a private cloud and a public cloud, the computer-implemented process comprising:
    randomly sampling a plurality of data sets of unprocessed data to generate a plurality of random samples respectively associated with each of the plurality of data sets;
    pre-processing, using a machine learning engine, the plurality of random samples to identify hidden correlations contained therein;
    evaluating the hidden correlations against a confidentiality model to characterize each of the plurality of data sets as to confidentiality;
    segmenting the plurality of data sets, by assigning the plurality of data sets to one of the private cloud or the public cloud, based upon the evaluating; and
    processing first data sets of the plurality of data sets assigned to the private cloud based upon the segmenting using the private cloud.

2. The computer-implemented process of claim 1, further comprising:
    processing second data sets of the plurality of data sets assigned to the public cloud based upon the segmenting using the public cloud.

3. The computer-implemented process of claim 2, wherein
    the segmenting includes identifying a sequence for the processing of the first data sets assigned to the private cloud and the processing of the second data sets assigned to the public cloud.

4. The computer-implemented process of claim 1, wherein
    the plurality of data sets of the unprocessed data is stored in the private cloud and the public cloud.

5. The computer-implemented process of claim 4, wherein
    the segmenting includes transferring a set of data sets, of the plurality of data sets, stored in the private cloud to the public cloud.

6. The computer-implemented process of claim 1, wherein
    the segmenting further includes determining a format of the unprocessed data, to be processed, based upon confidentiality requirements.

7. The computer-implemented process of claim 1, wherein
    the unprocessed data is dynamically re-segmented based upon changes to the unprocessed data.

8. A computer hardware system associated with a hybrid cloud including a private cloud and a public cloud, the computer hardware system comprising:
    a hardware processor configured to:
        randomly sample a plurality of data sets of unprocessed data to generate a plurality of random samples respectively associated with each of the plurality of data sets;
        pre-process, using a machine learning engine, the plurality of random samples to identify hidden correlations contained therein;
        evaluate the hidden correlations against a confidentiality model to characterize each of the plurality of data sets as to confidentiality;
        segment the plurality of data sets, by assigning the plurality of data sets to one of the private cloud or the public cloud, based upon the evaluation; and
        process first data sets of the plurality of data sets assigned to the private cloud based upon the segmentation using the private cloud.

9. The computer hardware system of claim 8, wherein the hardware processor is further configured to:
    process second data sets of the plurality of data sets assigned to the public cloud based upon the segmentation using the public cloud.

10. The computer hardware system of claim 9, wherein the segmentation includes identification of a sequence to process the first data sets assigned to the private cloud and to process the second data sets assigned to the public cloud.

11. The computer hardware system of claim 8, wherein the plurality of data sets of the unprocessed data is stored in the private cloud and the public cloud.

12. The computer hardware system of claim 11, wherein the segmentation includes transfer of a set of data sets, of the plurality of data sets, stored in the private cloud to the public cloud.

13. The computer hardware system of claim 8, wherein the segmentation further includes determination of a format of the unprocessed data, to be processed, based upon confidentiality requirements.

14. The computer hardware system of claim 8, wherein the unprocessed data is dynamically re-segmented based upon changes to the unprocessed data.

15. A computer program product, comprising:
    a computer readable storage medium having stored therein program code,
    the program code, which when executed by a computer hardware system associated with a hybrid cloud including a private cloud and a public cloud, cause the computer hardware system to perform:
        randomly sampling a plurality of data sets of unprocessed data to generate a plurality of random samples respectively associated with each of the plurality of data sets;
        pre-processing, using a machine learning engine, the plurality of random samples to identify hidden correlations contained therein;
        evaluating the hidden correlations against a confidentiality model to characterize each of the plurality of data sets as to confidentiality;
        segmenting the plurality of data sets, by assigning the plurality of data sets to one of the private cloud or the public cloud, based upon the evaluation; and
        processing first data sets of the plurality of data sets assigned to the private cloud based upon the segmenting using the private cloud.

16. The computer program product of claim 15, wherein the computer hardware system is further caused to perform:
    processing second data sets of the plurality of data sets assigned to the public cloud based upon the segmenting using the public cloud.

17. The computer program product of claim 16, wherein the segmenting includes identifying a sequence for the processing of the first data sets assigned to the private cloud and the processing of the second data sets assigned to the public cloud.

18. The computer program product of claim 15, wherein the plurality of data sets of the unprocessed data is stored in the private cloud and the public cloud.

19. The computer program product of claim 18, wherein the segmenting includes transferring a set of data sets, of the plurality of data sets, stored in the private cloud to the public cloud.

20. The computer program product of claim 15, wherein the segmenting further includes determining a format of the unprocessed data, to be processed, based upon confidentiality requirements.

* * * * *